(12) United States Patent
Conard et al.

(10) Patent No.: US 11,394,337 B2
(45) Date of Patent: Jul. 19, 2022

(54) METHOD AND CIRCUIT FOR SOFT STARTING A MIXER

(71) Applicant: WHIRLPOOL CORPORATION, Benton Harbor, MI (US)

(72) Inventors: Wayne W. Conard, Stevensville, MI (US); Jason P. Kachorek, St. Joseph, MI (US); Mark C. Schmidt, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 48 days.

(21) Appl. No.: 16/946,682

(22) Filed: Jul. 1, 2020

(65) Prior Publication Data

US 2022/0006419 A1 Jan. 6, 2022

(51) Int. Cl.
*H02P 29/032* (2016.01)
*B01F 35/221* (2022.01)
*A47J 43/08* (2006.01)

(52) U.S. Cl.
CPC .......... *H02P 29/032* (2016.02); *A47J 43/082* (2013.01); *B01F 35/221422* (2022.01)

(58) Field of Classification Search
CPC .. H02P 29/032; A47J 43/082; B01F 15/00389
USPC .............................. 318/400.21, 700
See application file for complete search history.

(56) References Cited

U.S. PATENT DOCUMENTS 4,823,057 A  4/1989 Eley
5,747,956 A  5/1998 Lamm
7,340,158 B2*  3/2008 Zeh .................. H02M 7/53875
388/804

(Continued)

FOREIGN PATENT DOCUMENTS

DE  2811302 C2  11/1984
JP  5963990 A  4/1984

OTHER PUBLICATIONS

Pookaiyaudom, S. et al., "Regular Corf:Espondence An Integrable Precision Voltage-to-Current Converter with Bilateral Capability", Froc. IEEE Elektron. Rundschau Electron. Lett. IEEE Journal of Solid-StateCircuits, Jun. 1978 (Jun. 1978), XP055866067, Retrieved from the Internet: URL:https://ieeexplore.ieee.org/stampPDF/getPDF.isp?tp=&arnumber=1051066&ref=aHR0cHM6Ly9pZWVleHBsb3JlLmllZWUub3JnL2RvY3VtZW50LzEwNTEwNjY [retrieved on Nov. 25, 2021].

(Continued)

*Primary Examiner* — David Luo
(74) *Attorney, Agent, or Firm* — Price Heneveld LLP

(57) ABSTRACT

A soft start circuit for a mixer is provided that includes an input for receiving an analog voltage representing a raw target speed; a current mirror for causing a speed target to change at a constant rate when the raw target speed represents a change from a current speed; and a comparator for receiving and comparing the raw target speed and an output from the current mirror and restricting the output from exceeding the raw target speed in order to restrict a soft start to only impede the speed target change when the raw target speed is increasing while not impeding the speed target change when the raw target speed is decreasing. The output of the soft start circuit is an analog representation of a soft start modified desired target speed.

20 Claims, 4 Drawing Sheets

(56) References Cited

U.S. PATENT DOCUMENTS

| | | | | |
|---|---|---|---|---|
| 8,198,843 B2* | 6/2012 | Kitagawa | ............... | H02P 27/08 |
| | | | | 318/400.06 |
| 8,466,643 B2 | 6/2013 | Kishimoto | | |
| 8,704,470 B2* | 4/2014 | Shimizu | ................... | H02P 6/17 |
| | | | | 318/400.04 |
| 8,829,837 B2* | 9/2014 | Galbiati | ................... | H02P 6/34 |
| | | | | 318/432 |
| 10,291,172 B2 | 5/2019 | Barfus et al. | | |
| 2010/0320946 A1 | 12/2010 | Ueda | | |
| 2012/0182000 A1 | 7/2012 | Kim et al. | | |
| 2013/0154595 A1 | 6/2013 | Drinovsky | | |

OTHER PUBLICATIONS

Kuphaldt Tony R.: "555 Ramp Generator" In: "555 Ramp Generator", Oct. 3, 2015 (Oct. 3, 2015), XP055865638, Retrieved from the Internet: URL:https://web.archive.org/web/20151003162638/https://www.allaboutcircuits.com/textbook/experiments/chpt-6/555-ramp-generator/>.

* cited by examiner

METHOD AND CIRCUIT FOR SOFT STARTING A MIXER

BACKGROUND OF THE DISCLOSURE

The present disclosure generally relates to portable appliances, such as stand mixers, and more specifically, to a soft start circuit for a stand mixer.

Stand mixers have been known to provide a soft start feature that restricts the rate of target speed change. This makes the mixer less likely to throw ingredients during the first seconds of mixing and does so in a pleasant and uniform way. An example of one such mixer is disclosed in commonly-assigned U.S. Pat. No. 10,291,172. The soft start feature in such mixers has been implemented using microcontrollers, which adds to the product cost.

SUMMARY OF THE DISCLOSURE

According to one aspect of the present disclosure, a soft start circuit is provided for a mixer. The soft start circuit comprises: an input for receiving an analog voltage representing a raw target speed; a current mirror for causing a speed target to change at a constant rate when the raw target speed represents a change from a current speed; and a comparator for receiving and comparing the raw target speed and an output from the current mirror and restricting the output from exceeding the raw target speed in order to restrict a soft start to only impede the speed target change when the raw target speed is increasing while not impeding the speed target change when the raw target speed is decreasing, wherein the output of the soft start circuit is an analog representation of a soft start modified desired target speed.

According to another aspect of the present disclosure, a method for soft starting a mixer is provided, the method comprising: receiving a raw target speed; comparing the raw target speed to a current speed of the mixer; when the raw target speed represents a change from the current speed, using a current mirror for causing a speed target to change at a constant rate; comparing the raw target speed and an output from the current mirror and restricting the output from exceeding the raw target speed in order to restrict a soft start to only impede the speed target change when the target speed is increasing while not impeding the speed target change when the target speed is decreasing; and outputting an analog representation of the soft start modified desired target speed.

According to yet another aspect of the present disclosure, a mixer comprises: a user input for receiving a desired speed and outputting a signal representing a raw target speed; a motor control circuit coupled to the user input for receiving the signal raw target speed and for outputting a motor control signal. The motor control circuit comprises a soft start circuit comprising: a current mirror for causing a speed target to change at a constant rate when the raw target speed represents a change from a current speed; and a comparator for receiving and comparing the raw target speed and an output from the current mirror and restricting the output from exceeding the raw target speed in order to restrict a soft start to only impede the speed target change when the raw target speed is increasing while not impeding the speed target change when the raw target speed is decreasing, wherein the output of the soft start circuit is an analog representation of a soft start modified desired target speed, and wherein the motor control signal is derived from the soft start modified desired target speed. The mixer further comprises a motor coupled to the motor control circuit for receiving the motor control signal, wherein the motor control signal represents a desired motor speed.

These and other features, advantages, and objects of the present disclosure will be further understood and appreciated by those skilled in the art by reference to the following specification, claims, and appended drawings.

Figure 1:
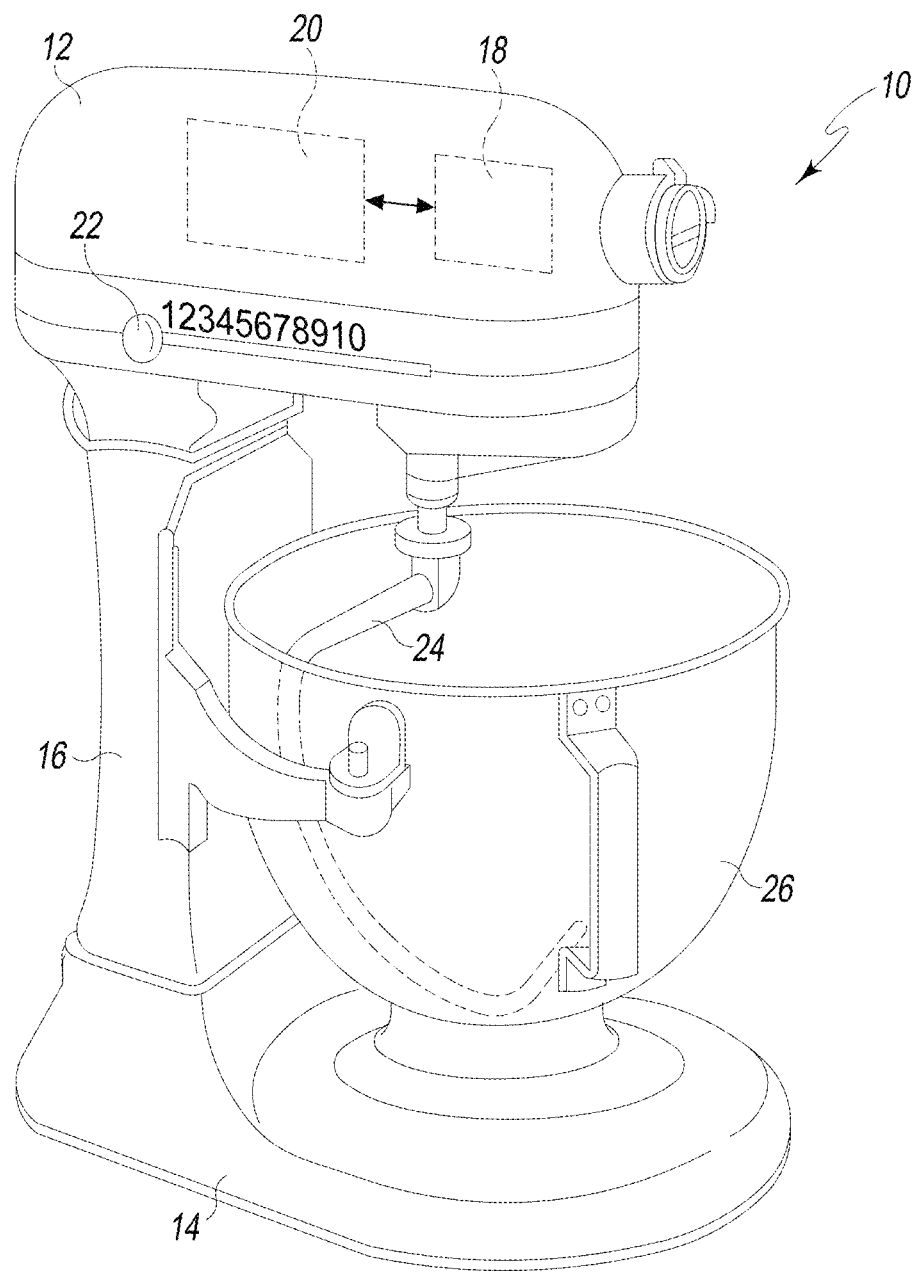
FIG. 1 is a perspective view of a portable appliance, embodied as a stand mixer having a dough hook.

The components in the figures are not necessarily to scale, emphasis instead being placed upon illustrating the principles described herein.

DETAILED DESCRIPTION

The present illustrated embodiments reside primarily in combinations of method steps and apparatus components related to a portable appliance, such as a stand mixer. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

A portable appliance 10, illustratively embodied as a stand mixer 10, is shown in FIG. 1. The stand mixer 10 has a mixer head 12 and a base 14 having an upstanding pedestal portion 16 supporting the mixer head 12. The mixer head 12 encases a motor 18 and associated electrical motor controls 20, which are shown in phantom. In some embodiments, the motor 18 and/or the motor controls 20 may alternatively be located in the base 14, including the upstanding pedestal portion 16.

A user input 22 is also included on the stand mixer 10. The user input 22 is illustratively embodied in FIG. 1 as a sliding speed control knob 22 mounted in the mixer head 12. The user may choose a desired speed setting with the control knob 22, and the motor controls 20 will generally attempt to operate the motor 18 at the desired speed. As shown in FIG. 1, the sliding speed control knob 22 is configured for multiple discrete speeds, indexed from 0 to 10, with an increment of 1. It will be appreciated that in other embodiments the user input 22 may be any type of analog or digital user interface operable to input a desired speed setting for the stand mixer 10.

The stand mixer 10 includes several mixing elements, which may be releasably attached to the mixer head 12 for rotation thereby. A mixing element embodied as a dough hook 24 is shown (partially in phantom) in FIG. 1. Other possible mixing elements include a wire whip, a flat beater, and the like. These mixing elements mix foodstuffs and other items in a mixer bowl 26, which is supported on the base 14. In the illustrative embodiment, the motor 18 is configured to provide motive power to the mixing element 24 via a planetary gear system. Exemplary planetary gear systems and their operation are described in U.S. Pat. Nos. 7,882,734 and 8,011,825, both of which are assigned to the assignee of the present application, and are expressly incorporated by reference herein in their entirety.

Figure 2:
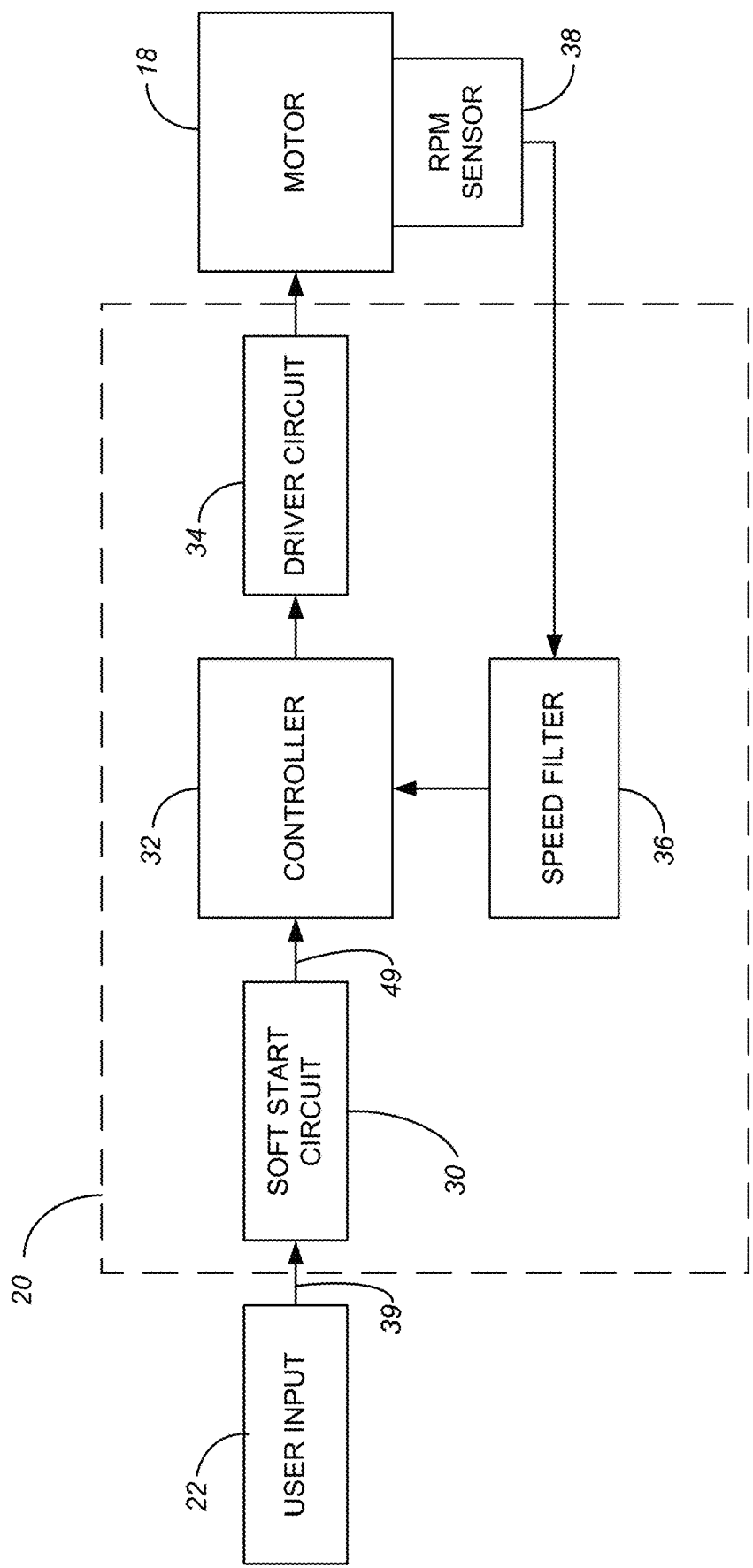
FIG. 2 is a block diagram of electrical components used in the portable appliance shown in FIG. 1.

FIG. 2 shows the electrical components of the mixer 10, which includes the user input 22, the motor control circuit 20, and the motor 18. The motor control circuit 20 includes a soft start circuit 30, a controller 32, a driver circuit 34, and a speed filter 36 that receives feedback from a revolutions per minute (RPM) sensor 38 that senses the rotational speed of the motor 18.

The soft start circuit 30, which is described further below, receives an output voltage from the user input 22 representing a desired target speed. If the desired target speed is increased by the user, the soft start circuit 30 causes the speed to change at a constant rate.

The controller 32 may be a proportional-integral-derivative (PID) controller. The controller 32 receives the output from the desired target speed output of the soft start circuit 30 and also receives the motor speed as sensed by the RPM sensor 38 and filtered by the speed filter 36. The controller 32 may compare the current motor speed with the desired target speed from the soft start circuit 30 in order to adjust the signal provided to the driver circuit 34 to reflect any desired change in the motor speed. The driver circuit 34 converts the output signal from the controller 32 into a form suitable for driving the motor 18.

Figure 3:
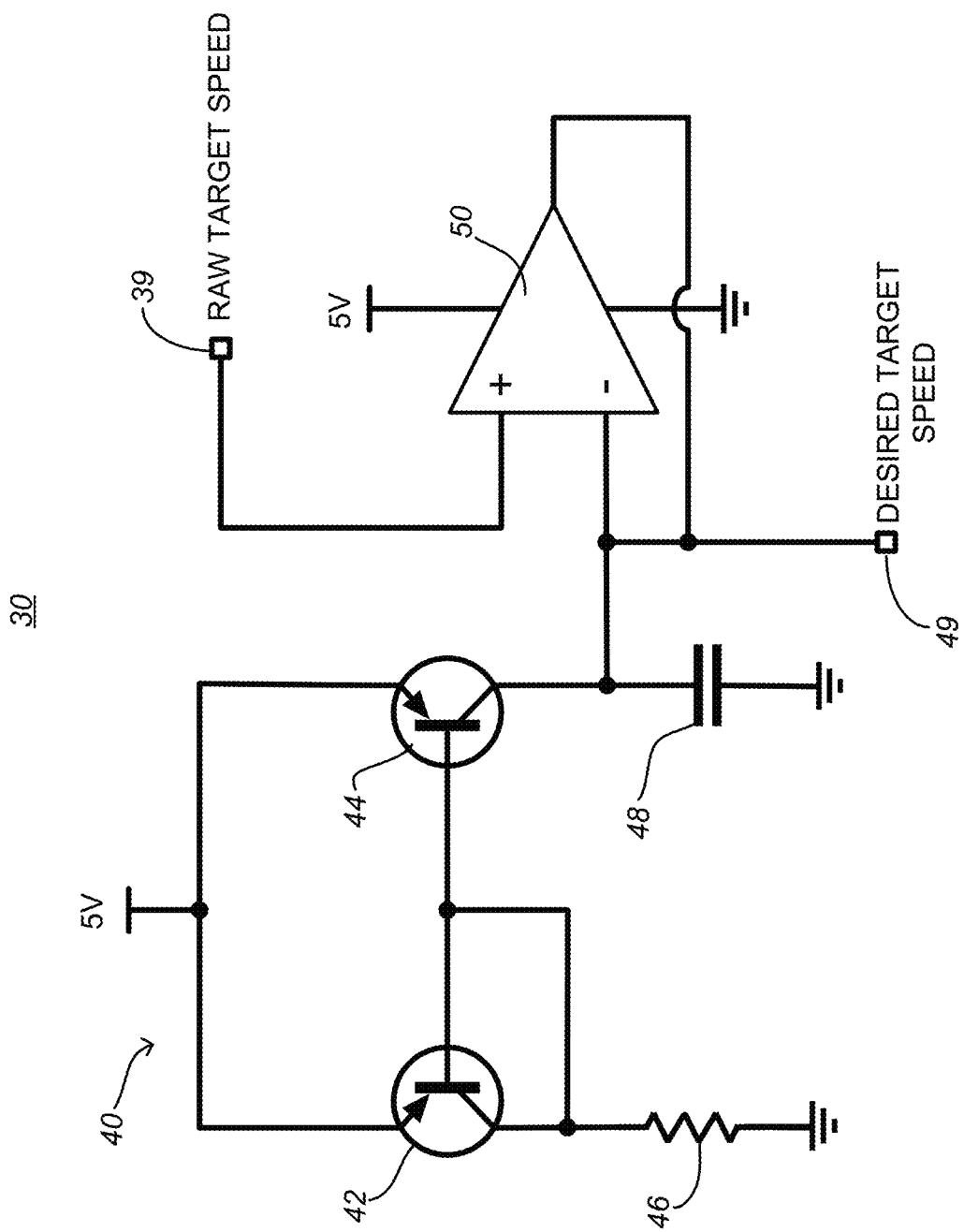
FIG. 3 is an electrical schematic of an example of a soft start circuit that may be as one of the electrical components shown in FIG. 2.

FIG. 3 shows an example of the soft start circuit 30, which may be analog and includes an input 39 for receiving an analog voltage representing a raw target speed; a current mirror 40 for causing a speed target to change at a constant rate when the raw target speed represents a change from the current speed; and a comparator 50 for receiving the raw target speed (at the V, input) and comparing the raw target speed and an output from the current mirror 40 and restricting a soft start to only impede the speed target change when the raw target speed is increasing while not impeding the speed target change when the raw target speed is decreasing, wherein an output terminal 49 of the soft start circuit 30 is an analog representation of the soft start modified target speed (e.g., the desired target speed).

The current mirror 40 may take any form. In the example shown in FIG. 3, the current mirror 40 includes a first transistor 42 and a second transistor 44, which may be PNP bipolar junction transistors (BJTs). The bases of the first transistor 42 and the second transistor 44 are coupled together and to a collector of the first transistor 42. The emitters of the first transistor 42 and the second transistor 44 are both coupled to a fixed source voltage (e.g., 5V). The collector of the first transistor 42 is coupled to ground through a resistor 46, which may have a resistance of 220 kΩ, for example. A collector of the second transistor 44 is coupled to a capacitor 48 (e.g., 10 μF) that is coupled at its other end to ground. The collector of the second transistor 44 is also coupled to the V_ input of the comparator 50.

The output of the comparator 50 is fed back to the V_ input of the comparator 50. The output terminal 49 that supplies the desired target speed is coupled to the output of the current mirror 40 (the collector of the second transistor 44), the V_ input and the output of the comparator 50.

Figure 4:
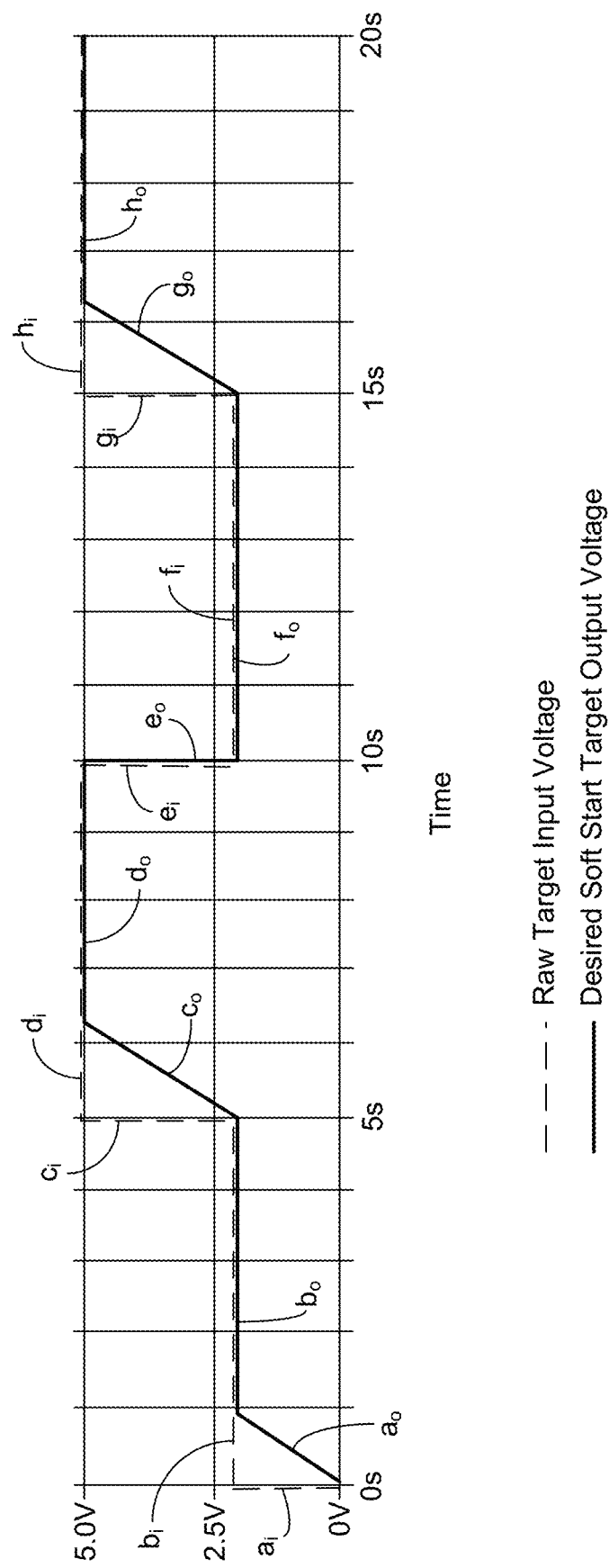
FIG. 4 is a graph showing an example of the raw target speed input versus the soft start modified target speed output from the soft start circuit of FIG. 3.

FIG. 4 shows a graph of both the raw target input voltage and the desired soft start target output voltage versus time to demonstrate an example of the desired target speed as an analog output voltage in response to changes of the analog raw target speed. As shown, when the raw target speed voltage increases through a first transition $a_i$ from a first voltage (0V) abruptly to a second voltage $b_i$, the desired target speed voltage increases gradually at a constant rate through a first transition $a_o$ from the first voltage (0V) to a second voltage $b_o$. Then again, when the raw target speed voltage increases through a second transition $c_i$ from the second voltage $b_i$ abruptly to a third voltage $d_i$, the desired target speed voltage increases gradually at a constant rate through a second transition $c_o$ from the second voltage $b_o$ to a third voltage $d_o$. However, when the raw target speed voltage decreases through a third transition $e_i$ from the third voltage $d_i$ abruptly to a fourth voltage $f_i$, the desired target speed voltage also decreases abruptly through a third transition $e_o$ from the third voltage $d_o$ to a fourth voltage $f_o$. Thereafter, when the raw target speed voltage increases through a fourth transition $g_i$ from the fourth voltage $f_i$ abruptly to a fifth voltage $h_i$, the desired target speed voltage increases gradually at a constant rate through a fourth transition $g_o$ from the fourth voltage $f_o$ to a fifth voltage $h_o$. Thus, the soft start circuit 30 achieves its goal of increasing the desired target speed at a constant rate over a delayed period of time while decreasing the desired target speed instantly.

The soft start circuit 30 provides a benefit in that it resides entirely within the analog electrical domain without requiring a relatively expensive microcontroller. Instead, the controller 32 may be implemented with an analog circuit as a result of the analog output of the soft start circuit 30. If only a capacitor were used, this would result in the speed following a resistor-capacitor (RC) curve, which means that the soft start will allow the target speed to change quickly at first and then slowly approach the target speed. The use of the current mirror 40 allows the output desired target speed to change at a constant rate.

According to a first aspect of the present disclosure, a soft start circuit is provided for a mixer, the soft start circuit comprising: an input for receiving an analog voltage representing a raw target speed; a current mirror for causing a speed target to change at a constant rate when the raw target speed represents a change from a current speed; and a comparator for receiving and comparing the raw target speed and an output from the current mirror and restricting the output from exceeding the raw target speed in order to restrict a soft start to only impede the speed target change when the raw target speed is increasing while not impeding the speed target change when the raw target speed is decreasing, wherein the output of the soft start circuit is an analog representation of a soft start modified desired target speed.

According to another aspect, the current mirror of the soft start circuit of the first aspect comprises a resistor connected to ground at a first end; a capacitor connected to ground at a first end; a first transistor having a base, a collector and an emitter; and a second transistor having a base, a collector and an emitter, wherein the bases of the first transistor and the second transistor are coupled together and to the collector of the first transistor, the emitters of the first transistor and the second transistor are both coupled to a fixed source voltage, the collector of the first transistor is coupled to a second end of the resistor, the collector of the second transistor is coupled to a second end of the capacitor, the collector of the second transistor is also coupled to a $V_-$ input of the comparator.

According to another aspect, an output of the comparator is fed back to the $V_-$ input of the comparator.

According to yet another aspect, an output terminal that supplies the desired target speed is coupled to the collector of the second transistor, the $V_-$ input and the output of the comparator.

According to yet another aspect, the input for receiving an analog voltage representing a raw target speed is coupled to a $V_+$ input of the comparator.

According to yet another aspect, wherein the first and second transistors are PNP bipolar junction transistors.

According to yet another aspect, a method is provided for soft starting a mixer, the method comprising: receiving a raw target speed; comparing the raw target speed to a current speed of the mixer; when the raw target speed represents a change from the current speed, using a current mirror for causing a speed target to change at a constant rate; comparing the raw target speed and an output from the current mirror and restricting the output from exceeding the raw target speed in order to restrict a soft start to only impede the speed target change when the target speed is increasing while not impeding the speed target change when the target speed is decreasing; and outputting an analog representation of the soft start modified desired target speed.

According to yet another aspect, the step of comparing the raw target speed and an output from the current mirror is performed by a comparator.

According to yet another aspect, an output of the comparator is fed back to a $V_-$ input of the comparator.

According to yet another aspect, an output terminal that supplies the desired target speed is coupled to the $V_-$ input and the output of the comparator.

According to yet another aspect, an input that receives an analog voltage representing the raw target speed is coupled to a $V_+$ input of the comparator.

According to yet another aspect, a mixer is provided comprising: a user input for receiving a desired speed and outputting a signal representing a raw target speed; a motor control circuit coupled to the user input for receiving the signal raw target speed and for outputting a motor control signal. The motor control circuit comprises a soft start circuit comprising: a current mirror for causing a speed target to change at a constant rate when the raw target speed represents a change from a current speed; and a comparator for receiving and comparing the raw target speed and an output from the current mirror and restricting the output from exceeding the raw target speed in order to restrict a soft start to only impede the speed target change when the raw target speed is increasing while not impeding the speed target change when the raw target speed is decreasing, wherein the output of the soft start circuit is an analog representation of a soft start modified desired target speed, and wherein the motor control signal is derived from the soft start modified desired target speed. The mixer further comprising a motor coupled to the motor control circuit for receiving the motor control signal, wherein the motor control signal represents a desired motor speed.

According to yet another aspect, the raw target speed is analog and wherein changes in the raw target speed are represented as incremental changes in voltage.

According to yet another aspect, the current mirror comprises: a resistor connected to ground at a first end; a capacitor connected to ground at a first end; a first transistor having a base, a collector and an emitter; and a second transistor having a base, a collector and an emitter, wherein the bases of the first transistor and the second transistor are coupled together and to the collector of the first transistor, the emitters of the first transistor and the second transistor are both coupled to a fixed source voltage, the collector of the first transistor is coupled to a second end of the resistor, the collector of the second transistor is coupled to a second end of the capacitor, the collector of the second transistor is also coupled to a $V_-$ input of the comparator.

According to yet another aspect, an output of the comparator is fed back to the $V_-$ input of the comparator.

According to yet another aspect, an output terminal that supplies the desired target speed is coupled to the collector of the second transistor, the $V_-$ input and the output of the comparator and the input for receiving an analog voltage representing a raw target speed is coupled to a $V_+$ input of the comparator.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A soft start circuit for a mixer, the soft start circuit comprising:
    an input for receiving an analog voltage representing a raw target speed;
    a current mirror for causing a speed target to change at a constant rate when the raw target speed represents a change from a current speed; and
    a comparator for receiving and comparing the raw target speed and an output from the current mirror and restricting the output from exceeding the raw target speed in order to restrict a soft start to only impede the speed target change when the raw target speed is increasing while not impeding the speed target change when the raw target speed is decreasing,
    wherein the output of the soft start circuit is an analog representation of a soft start modified desired target speed.

2. The soft start circuit of claim 1, wherein said current mirror comprises:
    a resistor connected to ground at a first end;
    a capacitor connected to ground at a first end;
    a first transistor having a base, a collector and an emitter; and
    a second transistor having a base, a collector and an emitter,
    wherein the bases of the first transistor and the second transistor are coupled together and to the collector of the first transistor, the emitters of the first transistor and the second transistor are both coupled to a fixed source voltage, the collector of the first transistor is coupled to a second end of the resistor, the collector of the second transistor is coupled to a second end of the capacitor, the collector of the second transistor is also coupled to a $V_-$ input of the comparator.

3. The soft start circuit of claim 2, wherein an output of the comparator is fed back to the $V_-$ input of the comparator.

4. The soft start circuit of claim 3, wherein an output terminal that supplies the desired target speed is coupled to the collector of the second transistor, the $V_-$ input and the output of the comparator.

5. The soft start circuit of claim 4, wherein the input for receiving an analog voltage representing a raw target speed is coupled to a $V_+$ input of the comparator.

6. The soft start circuit of claim 5, wherein the first and second transistors are PNP bipolar junction transistors.

7. The soft start circuit of claim 2, wherein an output terminal that supplies the desired target speed is coupled to the collector of the second transistor, the $V_-$ input and the output of the comparator.

8. The soft start circuit of claim 2, wherein the first and second transistors are PNP bipolar junction transistors.

9. The soft start circuit of claim 1, wherein an output of the comparator is fed back to a $V_-$ input of the comparator.

10. The soft start circuit of claim 1, wherein the input for receiving an analog voltage representing a raw target speed is coupled to a $V_+$ input of the comparator.

11. A method for soft starting a mixer, the method comprising:
    receiving a raw target speed;
    comparing the raw target speed to a current speed of the mixer;
    when the raw target speed represents a change from the current speed, using a current mirror for causing a speed target to change at a constant rate;
    comparing the raw target speed and an output from the current mirror and restricting the output from exceeding the raw target speed in order to restrict a soft start to only impede the speed target change when the target speed is increasing while not impeding the speed target change when the target speed is decreasing; and
    outputting an analog representation of the soft start modified desired target speed.

12. The method of claim 11, wherein the step of comparing the raw target speed and an output from the current mirror is performed by a comparator.

13. The method of claim 12, wherein an output of the comparator is fed back to a $V_-$ input of the comparator.

14. The method of claim 13, wherein an output terminal that supplies the desired target speed is coupled to the $V_-$ input and the output of the comparator.

15. The method of claim 12, wherein an input that receives an analog voltage representing the raw target speed is coupled to a $V_+$ input of the comparator.

16. A mixer comprising:
    a user input for receiving a desired speed and outputting a signal representing a raw target speed;
    a motor control circuit coupled to the user input for receiving the signal raw target speed and for outputting a motor control signal, the motor control circuit comprising a soft start circuit comprising:
        a current mirror for causing a speed target to change at a constant rate when the raw target speed represents a change from a current speed; and
        a comparator for receiving and comparing the raw target speed and an output from the current mirror and restricting the output from exceeding the raw target speed in order to restrict a soft start to only impede the speed target change when the raw target speed is increasing while not impeding the speed target change when the raw target speed is decreasing,
        wherein the output of the soft start circuit is an analog representation of a soft start modified desired target speed, and wherein the motor control signal is derived from the soft start modified desired target speed; and a motor coupled to the motor control circuit for receiving the motor control signal, wherein the motor control signal represents a desired motor speed.

17. The mixer of claim 16, wherein the raw target speed is analog and wherein changes in the raw target speed are represented as incremental changes in voltage.

18. The mixer of claim 16, wherein said current mirror comprises:
a resistor connected to ground at a first end;
a capacitor connected to ground at a first end;
a first transistor having a base, a collector and an emitter; and
a second transistor having a base, a collector and an emitter,
wherein the bases of the first transistor and the second transistor are coupled together and to the collector of the first transistor, the emitters of the first transistor and the second transistor are both coupled to a fixed source voltage, the collector of the first transistor is coupled to a second end of the resistor, the collector of the second transistor is coupled to a second end of the capacitor, the collector of the second transistor is also coupled to a $V_-$ input of the comparator.

19. The mixer of claim 18, wherein an output of the comparator is fed back to the $V_-$ input of the comparator.

20. The mixer of claim 19, wherein:
an output terminal that supplies the desired target speed is coupled to the collector of the second transistor, the $V_-$ input and the output of the comparator; and
the input for receiving an analog voltage representing a raw target speed is coupled to a $V+$ input of the comparator.

* * * * *